United States Patent
Armstrong et al.

(10) Patent No.: US 12,105,690 B1
(45) Date of Patent: Oct. 1, 2024

(54) MULTIPLE PASS SORT

(71) Applicant: Databricks Inc., San Francisco, CA (US)

(72) Inventors: Timothy Armstrong, San Francisco, CA (US); Arvind Sai Krishnan, San Bruno, CA (US); Khayyam Guliyev, Jersey City, NJ (US)

(73) Assignee: Databricks, Inc., San Francisco, CA (US)

( * ) Notice: Subject to any disclaimer, the term of this patent is extended or adjusted under 35 U.S.C. 154(b) by 78 days.

(21) Appl. No.: 17/875,176

(22) Filed: Jul. 27, 2022

(51) Int. Cl.
*G06F 16/00* (2019.01)
*G06F 16/22* (2019.01)
*G06F 16/2455* (2019.01)

(52) U.S. Cl.
CPC .... *G06F 16/2246* (2019.01); *G06F 16/24552* (2019.01)

(58) Field of Classification Search
CPC ........................ G06F 16/2246; G06F 16/24552
See application file for complete search history.

(56) References Cited

U.S. PATENT DOCUMENTS

| | | | |
|---|---|---|---|
| 6,614,789 B1 * | 9/2003 | Yazdani ................. | H04L 45/00 707/E17.042 |
| 6,789,156 B1 * | 9/2004 | Waldspurger ....... | G06F 12/1018 718/1 |
| 7,685,109 B1 * | 3/2010 | Ransil ................. | G06F 16/2255 707/999.003 |
| 7,788,268 B2 * | 8/2010 | Carroll ...................... | G06F 7/24 707/752 |
| 8,880,503 B2 * | 11/2014 | Modi ................ | G06F 16/24544 707/713 |
| 11,023,453 B2 * | 6/2021 | Kimura ............... | G06F 12/0238 |
| 11,354,093 B1 * | 6/2022 | Thabit ....................... | G06F 7/08 |
| 11,422,805 B1 * | 8/2022 | Kelly ....................... | G06F 7/766 |
| 2010/0082545 A1 * | 4/2010 | Bhattacharjee ......... | H03M 7/30 707/E17.013 |
| 2012/0095591 A1 * | 4/2012 | Wilson ...................... | B07C 3/08 700/214 |
| 2017/0235814 A1 * | 8/2017 | Branscome ....... | G06F 16/24532 707/737 |
| 2017/0286459 A1 * | 10/2017 | Chu .......................... | G06F 7/36 |
| 2020/0372004 A1 * | 11/2020 | Barber .................. | G06F 16/213 |
| 2023/0039860 A1 * | 2/2023 | Chipman ............ | G06F 16/2433 |

* cited by examiner

*Primary Examiner* — Leslie Wong

(74) *Attorney, Agent, or Firm* — Fenwick & West LLP

(57) ABSTRACT

A system for multipass sort includes a communication interface and a processor. The communication interface is configured to receive from a client device a request to sort a dataset that includes a plurality of rows. The processor is configured to perform a first sort pass on the dataset in part by: extracting prefixes associated with a first schema element associated with the dataset for the plurality of rows; and sorting the extracted prefixes utilizing an integer sort algorithm based on a sort order included in the request to sort the dataset, where sorting the extracted prefixes includes utilizing NULL values to resolve a tied range that includes at least two rows of the plurality of rows having a same extracted prefix.

20 Claims, 13 Drawing Sheets

MULTIPLE PASS SORT

BACKGROUND OF THE INVENTION

A sort operator is a basic building block of any query processing engine. The sort operator takes input rows that are out-of-order and puts them in order based on a user-specified sort order criteria (e.g., by column N entry). The sort operator can be used as part of answering a huge variety of queries, however, the sort operation is one of the slowest parts of query processing, that is, the sort operation has a major impact on how soon a user gets query results or how expensive a query is to run.

BRIEF DESCRIPTION OF THE DRAWINGS

Various embodiments of the invention are disclosed in the following detailed description and the accompanying drawings.

DETAILED DESCRIPTION

Figure 1A:
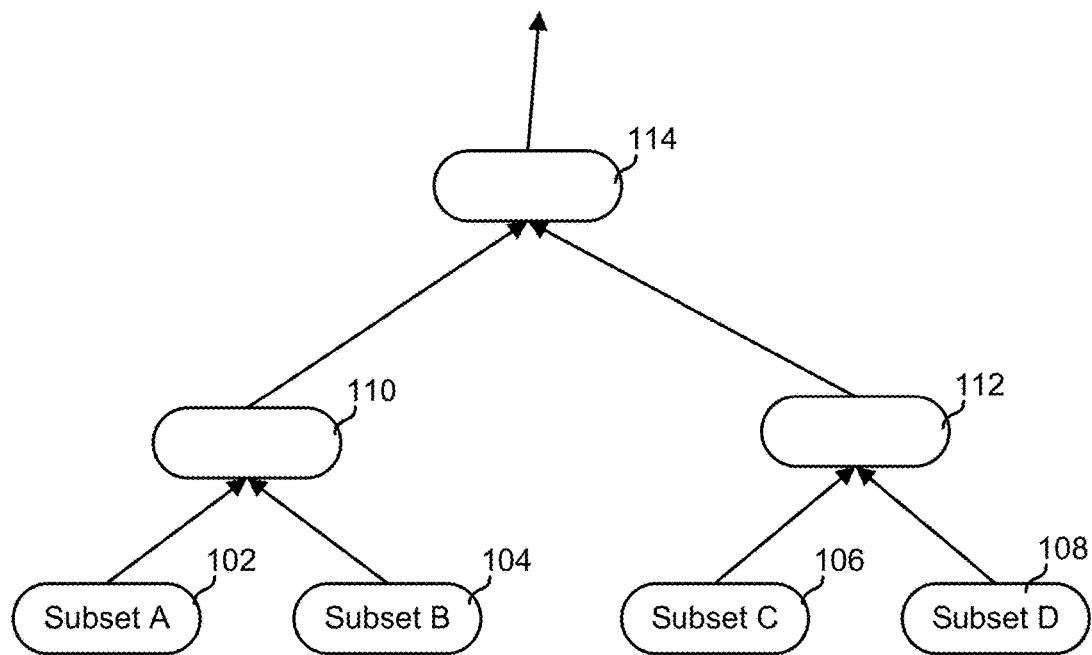
FIG. 1A illustrates an example of a binary merge tree having an even number of sorted data subsets.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications, and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A technique to sort a dataset is disclosed. The disclosed technique reduces the amount of time needed for a query processing engine to respond to a query by combining a plurality of sort algorithms into a single hybrid sort algorithm. A sort operator may be built using a single sort algorithm, however, such an algorithm is 2-5X slower than a sort operator that utilizes a plurality of sort algorithms.

Other systems may implement a single sort algorithm in which they compare all elements of the sort order at once instead of sequencing multiple algorithms together. This is significantly slower than utilizing a single hybrid sort algorithm. One limitation with using a single sort algorithm is that it does not adapt to the input data—the same algorithm is invoked regardless of input data. The disclosed hybrid sort algorithm may adaptively implement a plurality of different sort algorithms, such as MSB radix sort, TimSort and merge sort (with offset value codes), depending on the input data.

Maximizing performance requires a lot of work tuning and measuring performance of algorithms using desired execution hardware. The published work is limited on how to combine multiple sort algorithms together to implement a sort operator that can support arbitrary sort orders with good performance—it either is very old (i.e., obsolete hardware) or focuses on very narrow cases—for example, only supporting sort orders comprising a single 32-bit or 64-bit integer. However, arbitrary combination of sort orders of different combinations of types need to be supported. For example, if there are 5 data types and ascending (ASC) and descending (DESC) sort orders with keys up to 10 elements in length, then there are at least $(2*5)^{\wedge}10$ or approximately 10 billion possible comparison orders.

In some embodiments, the disclosed system improves the computer by understanding the different elements that the sort key may comprise and optimizes accordingly.

A database system includes a query processing engine. The query processing engine receives a request to sort a dataset from a client device. The request includes a sort order that specifies the ordering in which the rows of the dataset should be arranged. For example, given two input rows r1 and r2 and a sort order, the output of the sort is either r1 precedes r2 in the order, r2 precedes r1, or they are tied.

The request includes one or more input schema elements. For example, the input schema elements for an example dataset may be last name, first name, and data of birth. In some embodiments, the request includes the dataset on which the query processing engine performs the data sort. In some embodiments, the dataset is a dataset already stored by the database system.

In response to the request, the query processing engine determines whether a size of the dataset is greater than a threshold size (e.g., a number of rows that fits in a memory size—for example, 262144 (4096*64) rows). In response to a determination that the size of the dataset is not greater than the threshold size, the query processing engine performs an in-cache sort on the dataset in a memory of the database system.

In some embodiments, the dataset includes a sequence of n input rows and a sort order. The sequence of input rows has a known schema, which may include primitive and/or compound data types. Examples of primitive data types include 8/6/32/64-bit signed integer, Boolean, single and double precision float point numbers, fixed-precision decimal values (represented as signed 32/64/128-bit integers), UTF-8 and binary strings. Logical data types including date and timestamp may be sorted in the same way as a primitive data type. Examples of compound data types include struct, array, and map, each of which can contain a nested schema with one or more of the primitive or compound data types.

Performing the in-cache sort on the dataset includes representing a row sequence as an array of (64-bit integer, pointer) pairs, with the pointer pointing to the full row data. The 64-bit integer may be overwritten by the in-cache sort algorithm. The full row has a fixed-length portion including all elements of the schema and a NULL bit per element to indicate if the value is missing (i.e., NULL). Variable-length types—strings, arrays, and maps may reference additional memory stored outside of the fixed-length row.

The sort order is a sequence of input schema elements, indications for either ASCENDING (ASC) or DESCENDING (DESC), and/or indications of either NULLS FIRST or NULLS LAST, and/or another appropriate sort criteria. Rows will be sorted by the column and order specified by the first element, with ties broken by the column/order in the second element, and so on.

The 64-bit integer key field in the key-value arrays is used to hold "prefixes" of the rows being sorted. A prefix can be extracted from a row for each input schema element. Sorting by prefix is much faster than sorting by the full rows because the set of cache lines that needs to be accessed during the sort is much smaller and sorting by integers allows faster sort algorithms, such as radix sort, to be used.

Performing the in-cache sort on the dataset includes mapping an input value to a 64-bit signed integer prefix. In some embodiments, an 8/16/32/64-bit integer is sign-extended to a 64-bit integer. In some embodiments, a 32/64-bit decimal is sign-extended to a 64-bit integer. For a 128-bit decimal, in some embodiments, the most significant 64 bits is mapped to the 64-bit signed integer prefix. In some embodiments, a single/double-precision floating point is mapped to a 64-bit signed integer by returning the maximum possible prefix value if NaN (not a number), i.e., $2^{63}-1$. A "−0.0" value is normalized by replacing it with "0.0". The bits of the floating-point value are interpreted as a signed integer of the same and all of the bits are flipped except for the sign bit. The resulting integer preserves the original ordering of the floating point value. In some embodiments, a UTF-8 or binary string is mapped to a 64-bit signed integer prefix by taking the first 8 bytes of the string (e.g., padding with 0s if less than 8 bytes) and interpret the first 8 bytes as a 64-bit integer. In some embodiments, the query processing engine is little-endian. For such a query processing engine, the order of bytes in the integer is reversed, and the most significant bit is flipped. NULL values may be mapped to the minimum or maximum prefix value, i.e., $2^{63}-1$ or $-2^{63}$.

For a sort order schema element, the query processing engine performs a sort pass based on an input schema element to sort the key-value array using a radix sort or another sort algorithm that can sort by 64-bit integers. In some embodiments, a sort pass is performed in-place. In some embodiments, a sort pass is performed out-of-place.

Performing the in-cache sort includes the query processing engine identifying whether the dataset includes one or more tied ranges for the input schema element. A tied range corresponds to two or more rows that have the same prefix. The query processing engine determines whether the dataset is fully sortable by prefix for the input schema element (e.g., no tied ranges). In response to a determination that the dataset is fully sortable by prefix for the input schema element, the query processing engine determines whether the input schema element includes any NULL values. In response to a determination that input schema element includes at least two NULL values, the query processing engine identifies the tied range where the prefix for the rows associated with the identified tied range is equal to the prefix for the NULL value. For those rows, the query processing engine sorts the identified tied range based on NULL/non-NULL with NULLS first or NULLS last as requested. In response to a determination that the dataset is not fully sortable by prefix for the input schema element, the query processing engine sorts the identified tied ranges using a comparison sort (e.g., TimSort) that compares the rows by NULL/non-NULL then by the full key-value including the suffix.

The query processing engine is configured to repeat the above in-cache sort process for each input schema element.

In response to a determination that the size of the dataset is greater than the threshold size, the query processing engine generates a plurality of data subsets from the dataset. The query processing engine performs an in-cache sort as described herein on each of the data subsets.

The query processing engine merges the sorted data subsets. The query processing engine utilizes a binary merge tree to merge the sorted data subsets. Each sorted data subset corresponds to a leaf node of the binary merge tree. In some embodiments, the number of sorted data subsets is even. FIG. 1A illustrates an example of a binary merge tree having an even number of sorted data subsets. In the example shown, subset A 102 and subset B 104 are sorted/merged to node 110. Subset C 106 and subset D 108 are sorted/merged to node 112. Node 110 entries and node 112 entries are sorted/merged to node 114.

Figure 1B:
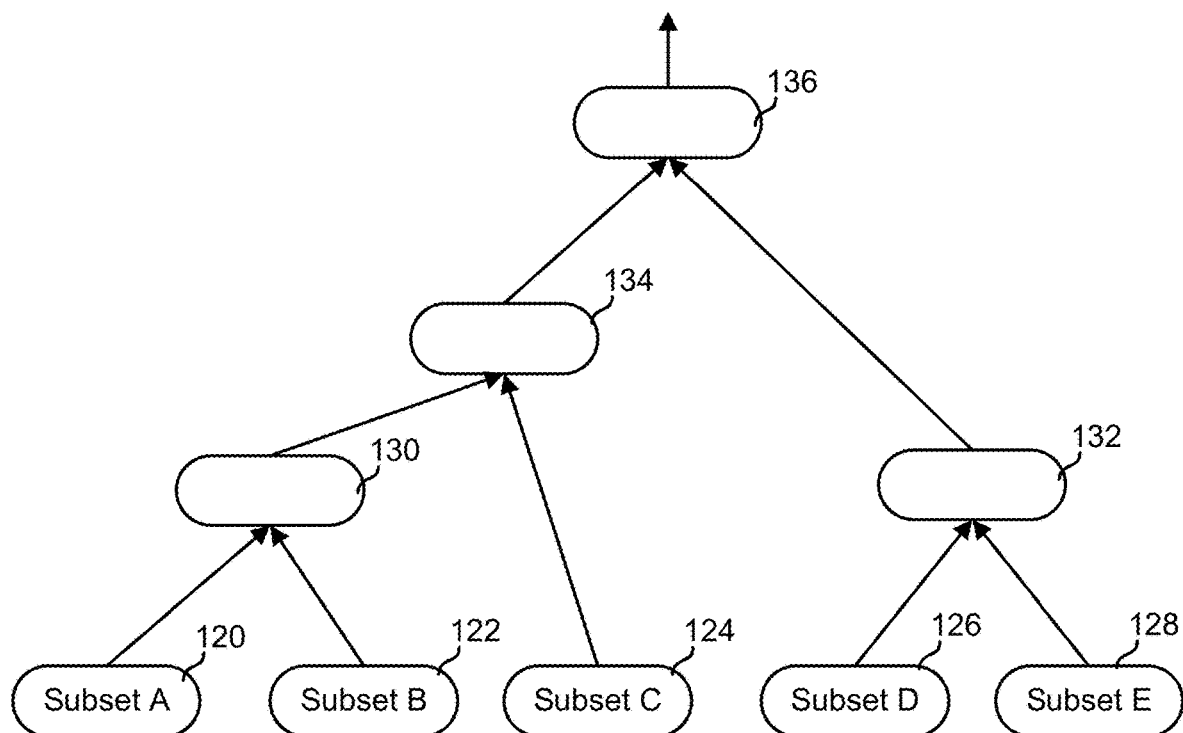
FIG. 1B illustrates an example of a binary merge tree having an even number of sorted data subsets.

In some embodiments, the number of sorted data subsets is odd. FIG. 1B illustrates an example of a binary merge tree having an odd number of sorted data subsets. In the example shown, subset A 120 and subset B 122 are sorted/merged to node 130. Subset C 124 and node 130 are sorted/merged to node 134. Subset D 126 and subset E 128 are sorted/merged to node 132. Node 134 entries and node 132 entries are sorted/merged to node 136.

In some embodiments, the query processing engine utilizes a pull-based model to merge the sorted data subsets from the leaf nodes to a root node of the binary merge tree. In a pull-based model, a root node requests sorted data from its children and the children propagate the request all the way down to the leaf node level of the binary merge tree. Each interior node includes a corresponding fixed-sized buffer to store the rows accumulated from its children. Merging the sorted data subsets in this manner ensures sorted order of the output by merging rows from children in sorted order at interior nodes. In some embodiments, the query processing engine utilizes a push-based model to merge the sorted data subsets from the leaf nodes to a root node of the binary merge tree. In some embodiments, the query processing engine utilizes a pull-based model to merge the sorted data subsets from the leaf nodes to a root node of the binary merge tree.

The query processing engine provides a sorted dataset to the client device after the rows from all of the subsets have been merged into the root node of the binary merge tree. In some embodiments, the sorted dataset is provided to another operator in the query or it could be returned to the client of the query engine.

Figure 2:
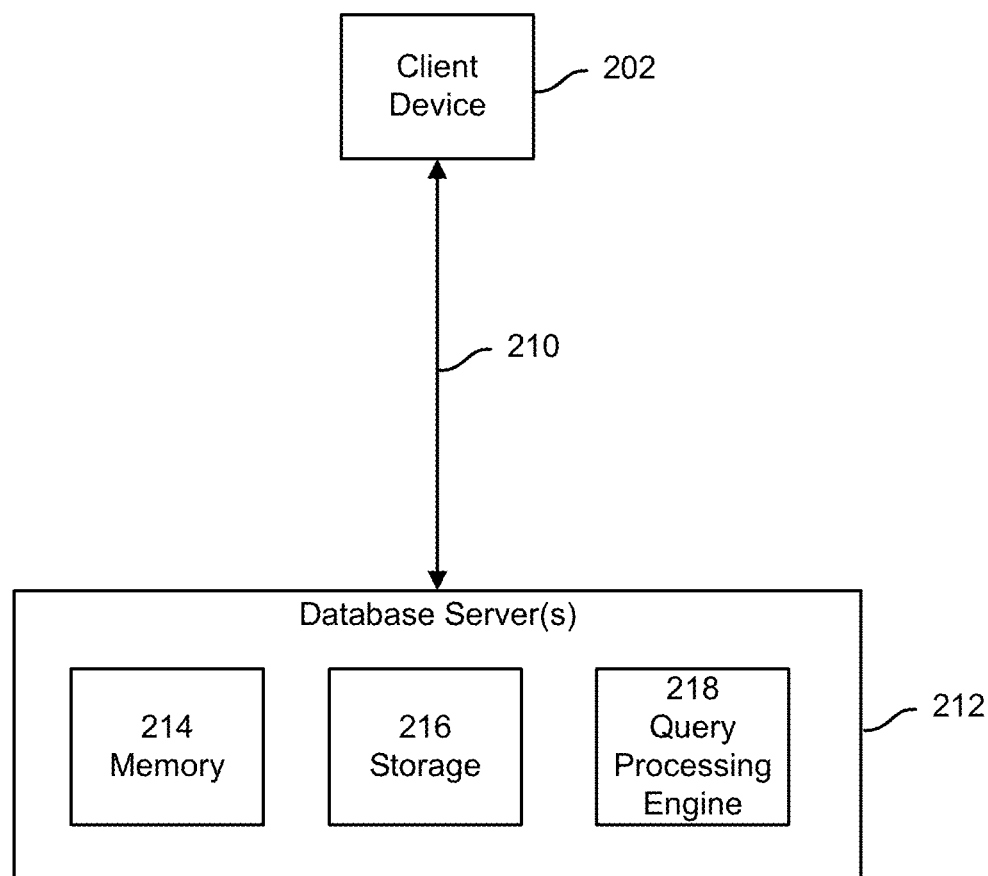
FIG. 2 is a block diagram illustrating a system for sorting a dataset in accordance with some embodiments.

FIG. 2 is a block diagram illustrating a system for sorting a dataset in accordance with some embodiments. In the example shown, system 200 includes client device 202 coupled to database server(s) 212 via connection 210. Client device 202 may be a computer, a laptop, a desktop, a server, a tablet, a smartphone, or any other computing device. Connection 210 may be a wired or wireless connection. Connection 210 may be a local area network (LAN), a wide area network (WAN), a storage area network (SAN), a virtual private network (VPN), a metropolitan area network (MAN), intranet, the Internet, and/or a combination thereof.

Database server(s) 212 includes memory 214, storage 216, and query processing engine 218. Query processing engine 218 receives from client device 202 a request to sort a dataset based on one or more input schema elements and an associated sort order for the one or more input schema elements. For example, the input schema elements may be id:64-bit integer, name: UTF-8 string, and price: 128-bit decimal. The sort order for the input schema elements may be "id ASCENDING NULLS FIRST", then "name ASCENDING NULLS FIRST," and then "price DESCENDING NULLS LAST". In some embodiments, client device 202 provides the dataset. In some embodiments, the dataset is stored in storage 216. In some embodiments, database server(s) 212 comprise(s) one or more hardware processors for executing instructions stored in memory 214 and/or storage 216.

In response to the request, query processing engine 218 determines whether a size of the dataset is greater than a threshold size (e.g., a number of rows that fits in a memory size—for example, 262144 (4096*64) rows). In response to a determination that the size of the dataset is not greater than the threshold size, query processing engine 218 performs an in-cache sort on the dataset. Rows of the dataset to be sorted are stored in memory 214 while query processing engine 218 performs the in-cache sort on the dataset. In response to determining that the size of the dataset is greater than the threshold size, the dataset is segmented into a plurality of subsets not greater than the threshold size.

The dataset includes a sequence of n input rows. The sequence of input rows has a known schema, which may include primitive and/or compound data types. Query processing engine 218 initiates the in-cache sort by representing each row sequence as a corresponding array of (64-bit integer, pointer) pairs for an input schema element, with the pointer pointing to the full row data. The request to sort the dataset may be sorted on one or more input schema elements. A row sequence may have a first array of pairs for a first input schema element, a second array of pairs for a second input schema element, . . . , and an nth array of pairs for an nth input schema element. The in-cache sort on the dataset may include query processing engine 218 performing a sort pass on the dataset for each of the one or more input schema elements. In some embodiments, a sort pass is performed in-place (e.g., sorted output associated with a sort pass is written to the same location as the input data). In some embodiments, a sort pass is performed out-of-place. An out-of-place sort pass may require the sorted output associated with a sort pass to be written to a different location than the input data (e.g., temporary working space in memory)

Performing a sort pass on the dataset for an input schema element includes query processing engine 218 mapping an input value associated with an input schema element to a 64-bit integer. In some embodiments, an 8/16/32/64-bit integer is sign-extended to a 64-bit integer. In some embodiments, a 32/64-bit decimal is sign-extended to a 64-bit integer. For a 128-bit decimal, in some embodiments, the most significant 64 bits is mapped to the 64-bit signed integer prefix. In some embodiments, a single/double-precision floating point is mapped to a 64-bit signed integer by returning the maximum possible prefix value if NaN (not a number), i.e., $2^{63}-1$. A "−0.0" value is normalized by replacing it with "0.0". The bits of the floating-point value are interpreted as a signed integer of the same and all of the bits are flipped except for the sign bit. The resulting integer preserves the original ordering of the floating point value. In some embodiments, a UTF-8 or binary string is mapped to a 64-bit signed integer prefix by taking the first 8 bytes of the string (e.g., padding with 0s if less than 8 bytes) and interpret the first 8 bytes as a 64-bit integer. In some embodiments, query processing engine 218 is little-endian. For such a query processing engine, the order of bytes in the integer is reversed and the most significant bit is flipped. NULL values may be mapped to the minimum or maximum prefix value, i.e., $2^{63}-1$ or $-2^{63}$.

Performing the sort pass on the dataset for the input schema element further includes query processing engine 218 extracting a prefix from each row of the dataset and sorting the dataset using a sort algorithm, such as a radix sort, according to the specified sort order for the input schema element. Sorting by prefix is much faster than sorting by the full rows because the set of cache lines that needs to be accessed during the sort is much smaller and sorting by integers allows faster sort algorithms, such as radix sort, to be used.

The sort pass further includes query processing engine 218 determining whether the sorted dataset includes one or more tied ranges for the input schema element. A tied range corresponds to two or more rows that have the same prefix. Query processing engine 218 determines whether the dataset is fully sortable by prefix for the input schema element (e.g., no tied ranges excluding NULL values). In response to a determination that the dataset is fully sortable by prefix for the input schema element, query processing engine 218 determines whether the input schema element includes any NULL values. In response to a determination that the dataset for the input schema element includes at least two NULL values, query processing engine 218 identifies the tied range where the prefix for the rows associated with the identified tied range is equal to the prefix for the NULL value. For those rows, query processing engine 218 sorts the identified tied range based on NULL/non-NULL with NULLS first or NULLS last as indicated by the sort request.

In response to a determination that the dataset is not fully sortable by prefix for the input schema element (e.g., at least two rows have the same prefix), query processing engine 218 sorts the identified tied range(s) using a comparison sort (e.g., TimSort) that compares the rows by NULL/non-NULL then by the full key-value including the suffix.

Query processing engine 218 is configured to repeat the above the sort pass process for one or more additional input schema elements.

In response to a determination that the size of the dataset is greater than the threshold size, query processing engine 218 subdivides the dataset into a plurality of data subsets. Query processing engine 218 is configured to perform an in-cache sort as described herein on each of the data subsets.

After each of the data subsets is sorted, query processing engine 218 merges the sorted data subsets into a single sorted dataset. Query processing engine may utilize a binary merge tree to merge the sorted data subsets. Each sorted data subset corresponds to a leaf node of the binary merge tree. In some embodiments, the number of sorted data subsets is even. In some embodiments, the number of sorted data subsets is odd. In some embodiments, query processing engine 218 utilizes a pull-based model to merge the sorted data subsets from the leaf nodes to a root node of the binary merge tree. In a pull-based model, a root node requests sorted data from its children and the children propagate the request all the way down to the leaf node level of the binary merge tree. Each interior node includes a corresponding fixed-sized buffer to store the rows accumulated from its children. The rows from a child node may be merged to a parent or interior node in batches. For example, a first batch of rows associated with a first leaf node (e.g., N rows—for example, 4096 rows) may be merged with a second batch of rows associated with a second leaf node (e.g., N rows—for example, 4096 rows) into a first interior node having a fixed-sized buffer that is capable of storing the sorted first and second batch of rows. The batch of rows associated with the first interior node may be merged with a batch of rows associated with a second interior node into a higher interior node (e.g., root node, parent node, etc.) while another batch of rows is merged from the first leaf node and the second leaf node into the first interior node and another batch of rows is merged from a third leaf node and a fourth leaf node into the second interior node. Merging the sorted data subsets in this manner ensures sorted order of the output by merging rows from children in sorted order at interior nodes. In some embodiments, query processing engine 218 utilizes a push-based model to merge the sorted data subsets from the leaf nodes to a root node of the binary merge tree. For example, in the case where it is desired to parallelize sorting, multiple threads could be doing the in-cache sorting and pushing rows into the leaf nodes of a binary tree merge.

Query processing engine 218 provides a sorted dataset to client device 202 after all of the rows associated with the data subsets have been merged into a root node of the binary merge tree.

Figure 3:
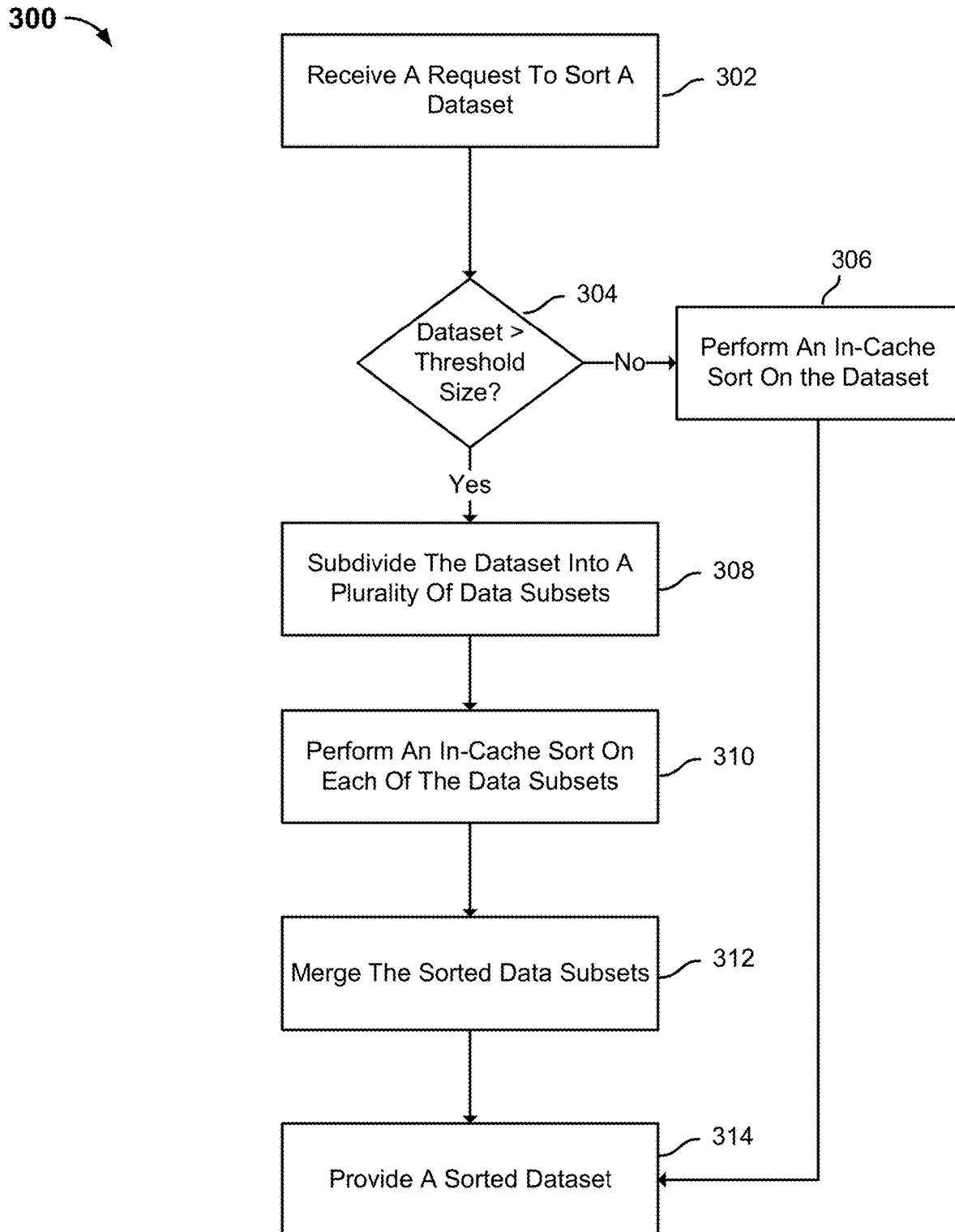
FIG. 3 is a flow diagram illustrating a process of sorting a dataset in accordance with some embodiments.

FIG. 3 is a flow diagram illustrating a process of sorting a dataset in accordance with some embodiments. In the example shown, process 300 may be implemented by a query processing engine, such as query processing engine 218.

At 302, a request to sort a dataset is received. For example, the request may indicate one or more input schema elements for which the dataset is to be sorted and an associated sort order for the one or more input schema elements. In some embodiments, the input schema elements may be id:64-bit integer, name: UTF-8 string, and price: 128-bit decimal and the sort order for the input schema elements may be "id ASCENDING NULLS FIRST", then "name ASCENDING NULLS FIRST," and then "price DESCENDING NULLS LAST".

At 304, it is determined whether a size of the dataset is greater than a threshold size. In response to a determination that the size of the dataset is not greater than the threshold size, process 300 proceeds to 306. In response to a determination that the size of the data size is greater than the threshold size, process 300 proceeds to 308.

At 306, an in-cache sort is performed on the dataset. For example, the in-cache sort is processed and the dataset includes at least two inputs: a sequence of n input rows and the sort order. In some embodiments, the query processing engine utilizes a push-based model to merge the sorted data subsets from the leaf nodes to a root node of the binary merge tree. The output is the same n rows as the input reordered based on the sort order, such that the row at position i precedes or is tied with the row at i+1 for all values of i from i to n−1. In some embodiments, the sort is stable, that is, if the rows at i and i+1 are ties, then they are in the same relative order as the input sequence.

The sequence of input rows has a known schema, which may include primitive and/or compound data types. The in-cache sort is initiated by representing each row sequence as a corresponding array of (64-bit integer, pointer) pairs for an input scheme element, with the pointer pointing to the full row data. A corresponding sort pass is performed on the dataset for each of the one or more input schema elements. In some embodiments, a sort pass is performed in-place. In some embodiments, a sort pass is performed out-of-place. An out-of-place sort pass may require the sorted output associated with a sort pass to be written to a different location than the input data (e.g., temporary working space in memory). In some embodiments, multiple arrays are utilized to perform a sort pass.

Performing a sort pass on the dataset for an input schema element includes mapping an input value associated with an input schema element to a 64-bit integer. The 64-bit integer is used to extract a prefix from each row of the dataset. The extracted prefix is used by a sort algorithm, such as a radix sort, to sort the input rows according to the specified sort order for the input schema element.

Performing the sort pass includes determining whether the sorted dataset includes one or more tied ranges for the input schema element. A tied range corresponds to two or more rows that have the same prefix.

Performing the sort pass includes determining whether the dataset is fully sortable by prefix for the input schema element (e.g., no tied ranges excluding NULL values). In response to a determination that the dataset is fully sortable by prefix for the input schema element, it is determined whether the input schema element includes any NULL values. In response to a determination that the dataset for the input schema element includes at least two NULL values, the tied range where the prefix for the rows associated with the identified tied range is equal to the prefix for the NULL value is identified. For those rows, the identified tied range is sorted based on NULL/non-NULL with NULLS first or NULLS last as indicated by the sort request.

In response to a determination that the dataset is not fully sortable by prefix for the input schema element (e.g., at least two rows have the same prefix), the identified tied range(s) are sorted using a comparison sort (e.g., TimSort) that compares the rows by NULL/non-NULL then by the full key-value including the suffix.

At 308, the subset is subdivided into a plurality of data subsets. In some embodiments, the subdivision of the dataset is interleaved with the in-cache sorting (i.e., one subset is built up, then sorted in cache, then another subset is built, then sorted in cache, etc.).

At 310, an in-cache sort is performed on each of the data subsets.

At 312, the sorted data subsets are merged. For example, the query processing engine utilizes a binary merge tree to merge the sorted data subsets. Each sorted data subset corresponds to a leaf node of the binary merge tree. In some embodiments, the number of sorted data subsets is even. In some embodiments, the number of sorted data subsets is odd. In some embodiments, the query processing engine utilizes a pull-based model to merge the sorted data subsets from the leaf nodes to a root node of the binary merge tree. In a pull-based model, a root node requests sorted data from its children and the children propagate the request all the way down to the leaf node level of the binary merge tree. Each interior node includes a corresponding fixed-sized buffer to store the rows accumulated from its children. In some embodiments, the query processing engine utilizes a push-based model to merge the sorted data subsets from the leaf nodes to a root node of the binary merge tree.

At 314, a sorted dataset is provided. For example, the sorted dataset is provided to the requestor.

Figure 4:
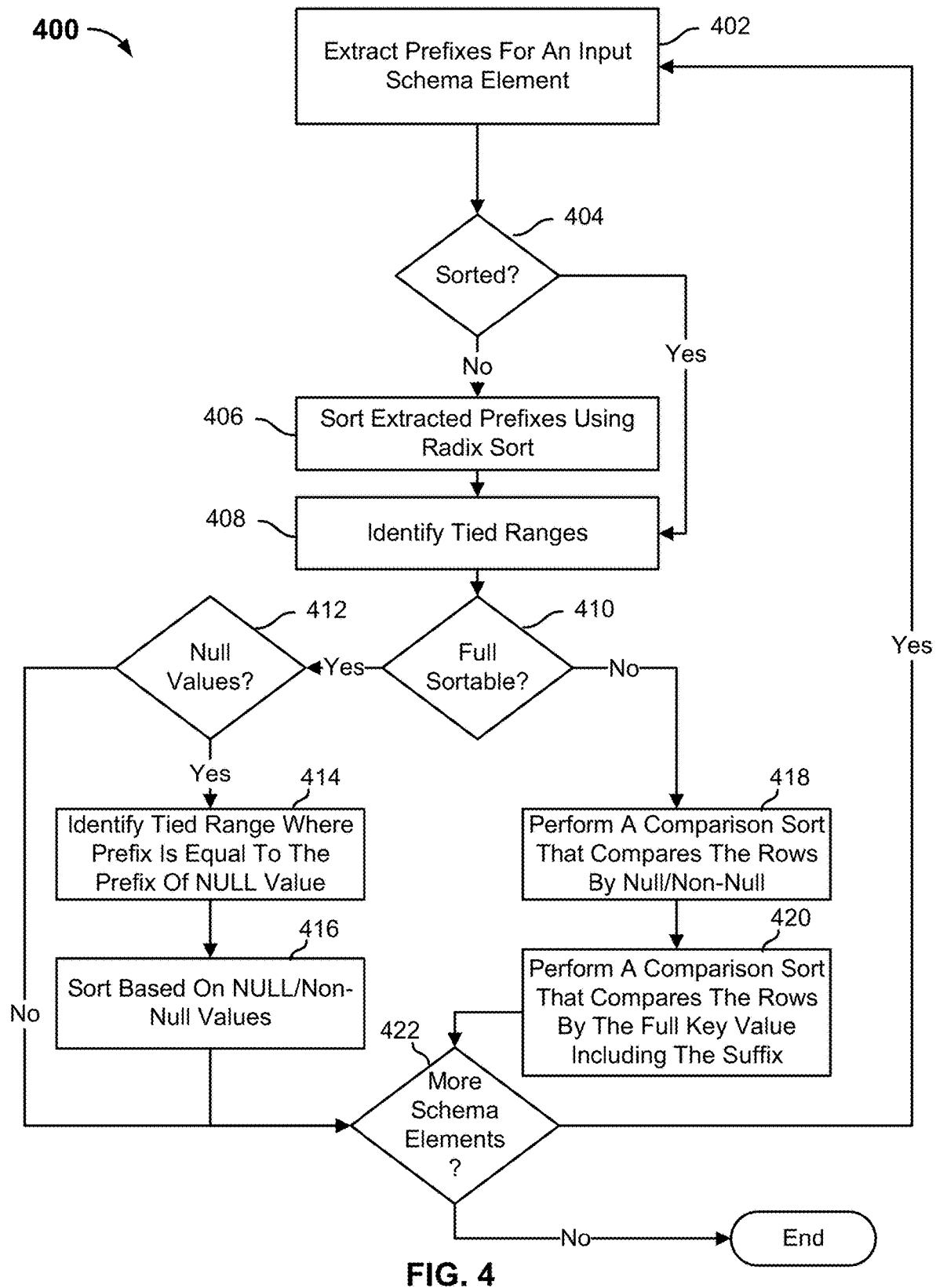
FIG. 4 is a flow diagram illustrating a process of performing an in-cache sort in accordance with some embodiments.

FIG. 4 is a flow diagram illustrating a process of performing an in-cache sort in accordance with some embodiments. In some embodiments, process 400 may be implemented by a query processing engine, such as query processing engine 218. In some embodiments, process 300 may be implemented to perform some of step 306 or step 310 of process 300.

At 402, prefixes are extracted for an input schema element. In various embodiments, an input value associated with an input schema element is a primitive and/or compound data type. For example, a row included in the dataset may be represented as an array of (64-bit integer, pointer) pair with the pointer of the array pointing to the full row data.

Examples of primitive data types include 8/6/32/64-bit signed integer, Boolean, single and double precision float point numbers, fixed-precision decimal values (represented as signed 32/64/128-bit integers), UTF-8 and binary strings. Logical data types including date and timestamp may be sorted in the same way as a primitive data type. Examples of compound data types include struct, array, and map, each of which can contain a nested schema with one or more of the supported data types.

An integer value, such as a 64-bit integer value, is extracted from an input value associated with the input schema element to become the "64-bit integer" value of the array pair. In some embodiments, an 8/16/32/64-bit integer is sign-extended to a 64-bit integer. In some embodiments, a 32/64-bit decimal is sign-extended to a 64-bit integer. For a 128-bit decimal, in some embodiments, the most significant 64 bits is mapped to the 64-bit signed integer prefix. In some embodiments, a single/double-precision floating point is mapped to a 64-bit signed integer by returning the maximum possible prefix value if NaN (not a number), i.e., $2^{63}-1$. A "−0.0" value is normalized by replacing it with "0.0". The bits of the floating-point value are interpreted as a signed integer of the same and all of the bits are flipped except for the sign bit. The resulting integer preserves the original ordering of the floating point value. In some embodiments, a UTF-8 or binary string is mapped to a 64-bit signed integer prefix by taking the first 8 bytes of the string (e.g., padding with 0s if less than 8 bytes) and interpret the first 8 bytes as a 64-bit integer. In some embodiments, the query processing engine is little-endian. For such a query processing engine, the order of bytes in the integer is reversed and the most significant bit is flipped. NULL values may be mapped to the minimum or maximum prefix value, i.e., $2^{63}-1$ or $-2^{63}$.

At 404, it is determined if the dataset is already sorted. In some embodiments, a dataset is already sorted by prefix for the input schema element. In some embodiments, the dataset is sorted in reverse order by prefix for the input schema element. In response to a determination that the array is already sorted, process 400 proceeds to 408. In response to a determination that the array is not already sorted, process 400 proceeds to 406.

At 406, the rows corresponding to the extracted prefixes are sorted using a radix sort.

At 408, tied ranges are identified, if any. In some embodiments, a tied range corresponds to two or more rows that have the same prefix for the input schema element.

At 410, it is determined if the rows associated with the dataset are fully sorted for the input schema element. When extracting string prefixes, additional statistics, such as whether any string is greater than 8 bytes in length and whether the first 8 bytes of the string include a 0 byte. If both are false, then all bytes of the input string are included in the prefix and there is no ambiguity between padding 0 bytes and 0 bytes from the input string (e.g., "hell" vs "hell\0"). Therefore, the input is fully sortable by prefix.

In response to a determination that the array is fully sorted for the input schema element, process 400 proceeds to 412. In response to a determination that the array is not fully sorted for the input schema element, process 400 proceeds to 418.

At 412, it is determined whether there are any NULL values in the dataset for the input schema element. In response to a determination that there are NULL value(s) in the dataset for the input schema element, process 400 proceeds to 414. In response to a determination that there are no null value(s) in the dataset for the input schema element, process 400 proceeds to 422.

At 414, a tied range where the prefix for a plurality of rows is equal to the prefix of a NULL value is identified.

At 416, the tied range is sorted based on NULL/non-NULL values. In some embodiments, the range is sorted with NULLS first as indicated in the dataset sort request. In some embodiments, the range is sorted with NULLS last as indicated in the dataset sort request.

In some embodiments, a non-NULL value (e.g., a min/max value of a 64-bit integer) could have the same prefix as a NULL value. So, a tied range could have a mixture of NULL and non-NULL values. In this case, the sorting puts NULL values before non-NULL or vice versa depending on the order requested. For example, the following algorithm is used:

Given n input rows with a prefix equal to the prefix for the NULL value:
1. count the #of NULL rows in the input, call the result k;
2. if k=0 or k=n, no further work is required;
3. copy the input rows into the output space, starting at offset 0 for NULL rows and offset k for non-NULL rows (if NULLS_FIRST, vice versa if NULLS_LAST).

At 418, a comparison sort that compares the rows by null/non-null is performed for the identified tied range(s).

At 420, a comparison sort that compares the rows by full key value including the suffix is performed for the identified tied range(s).

At 422, it is determined whether there are any more input schema elements associated with the sort request. In response to a determination that are more input schema elements associated with the sort request, process 400 returns to 402 where the dataset is further sorted for the next input schema element. In response to a determination that there are no more input schema elements associated with the sort order, process 400 ends.

Figure 5A:
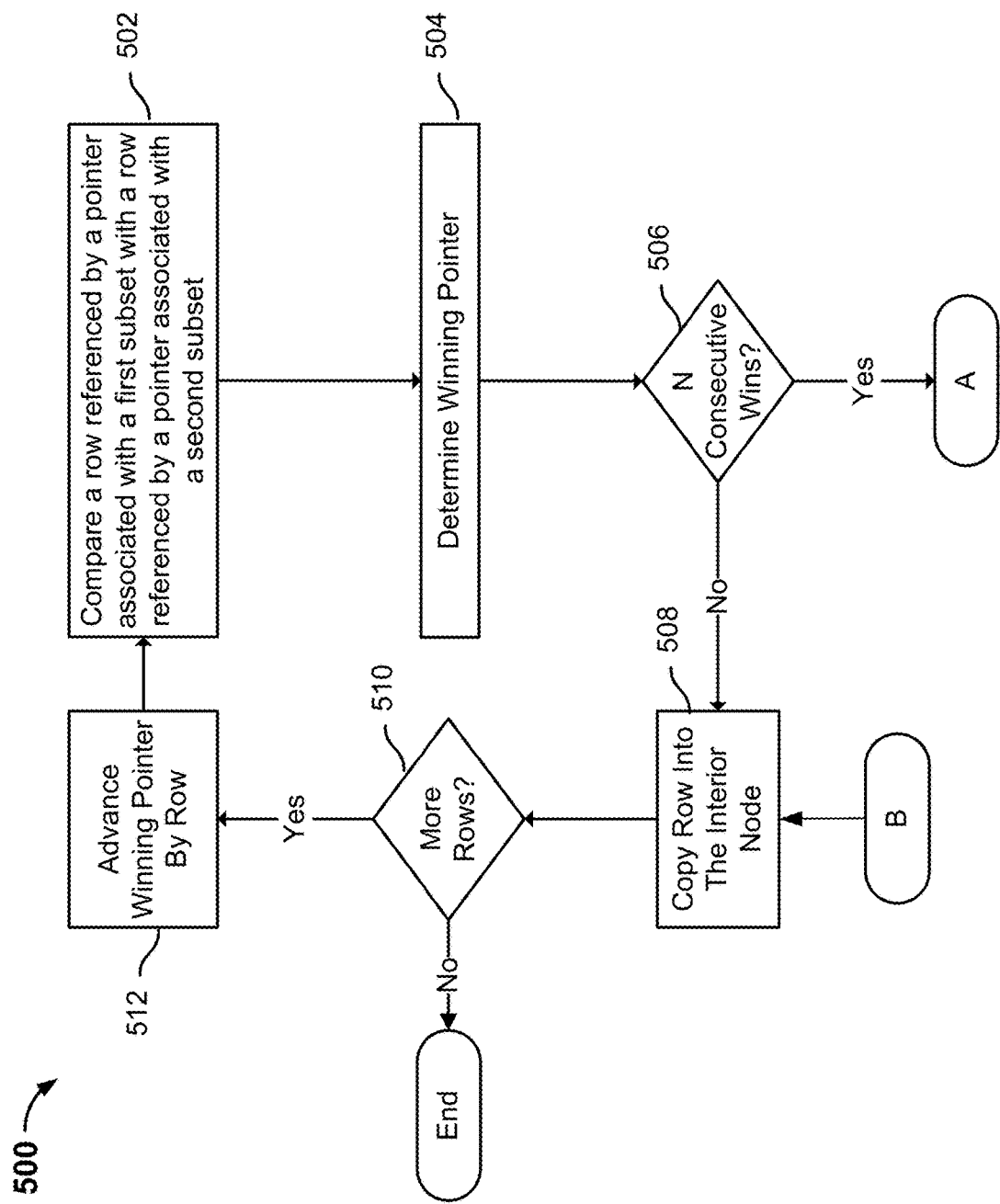
FIG. 5A and FIG. 5B are flow diagrams illustrating a process of merging data subsets in accordance with some embodiments.
Figure 5B:
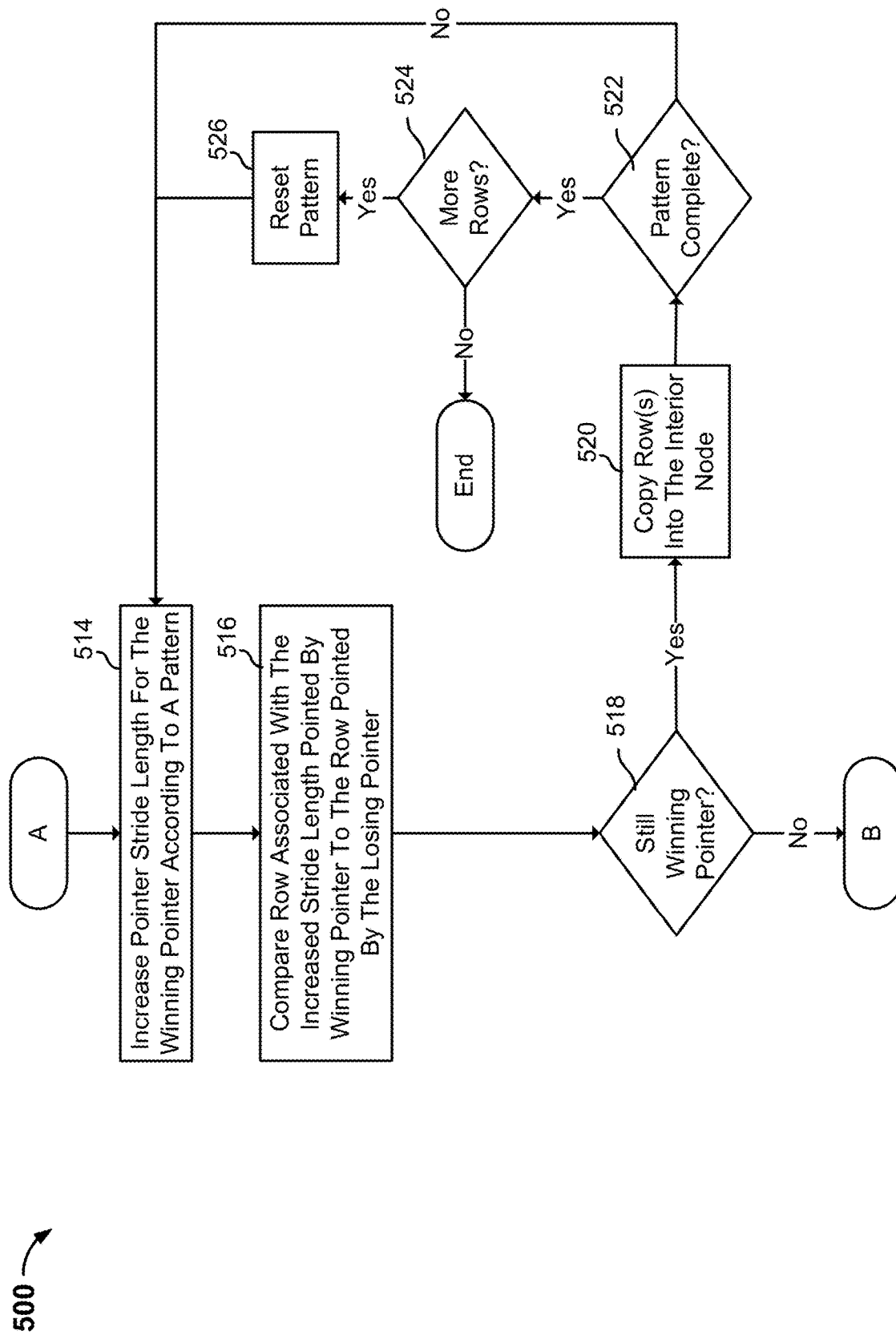

FIG. 5A and FIG. 5B are flow diagrams illustrating a process of merging data subsets in accordance with some embodiments. In some embodiments, process 500 of FIG. 5A and FIG. 5B may be implemented by a query processing engine, such as query processing engine 218. In some embodiments, process 500 may be implemented to perform some of step 312 of process 300.

At 502, a row referenced by a first pointer associated with a first subset is compared with a row referenced by a second pointer associated with a second subset. In some embodiments, a dataset is being sorted using a single sort key (e.g., a single input schema element). In some embodiments, a dataset is being sorted using a plurality of sort keys (e.g., a plurality of input schema elements). Each sort key may have a corresponding prefix.

In some embodiments, the row referenced by the first pointer associated with the first subset and the referenced by the second pointer associated with the second subset have corresponding offset value codes. Offset value codes may be used for multi-key sorts. An offset value code encodes a specific sort key's information making comparisons more efficient when the first sort key is not enough to determine the sort order. The offset value code associated with a first row of a subset is relative to an empty row. It captures information about the first sort key. The offset value code of other rows is relative to the preceding row in the subset. For example, the offset value code of a second row of a subset is based on the first row of the subset. The offset value code of the second row captures information of the first different key between the rows. Two rows being compared must contain offset value codes relative to the same third row for the comparison to be valid.

The offset value code associated with a row includes an offset and a value. The offset indicates the index of the sort key at which the two rows differ. For example, a row may have a row sequence of: "k1, k2, . . . , kn". An index position for the keys associated with the row are "1, 2, . . . , n". The value holds the value of the sort key at the index of the losing row.

At 504, a winning pointer is determined based on the sort order. In some embodiments, the winning pointer is determined to be the pointer that references row having a prefix that causes the row to be included in the merged data subset before the other row (e.g., ASCENDING sort order). In some embodiments, the winning pointer is determined to be the pointer that references row having a prefix that causes the row to be included in the merged data subset after the other row (e.g., DESCENDING sort order).

In some embodiments, for a multi-key sort, the prefix associated with a first key for a first row is compared to the prefix associated with the first key for a second row. A tie is broken by accessing and comparing each sort key one after the other from the underlying row data. For example, the prefix associated with a second key for a first row is compared to the prefix associated with the second key for the second row. If the tie still exists, the prefix associated with a third key for the first row is compared to the prefix associated with the third key for the second row. This may continue for additional keys until the tie between the two rows is resolved.

For embodiments that utilize offset value codes to compare two rows, a tie is broken by comparing the value at each index position until there is a winning row. The offset value code of the losing row is updated based on the comparison. An example of this is depicted in FIG. 6C.

At 506, it is determined whether the winning pointer has a threshold number N of consecutive wins (e.g., 7 consecutive wins). In response to a determination that the winning pointer does not have N consecutive wins, process 500 proceeds to 508. In response to a determination that the winning pointer has N consecutive wins, process 500 proceeds to 514.

At 508, the row associated with the winning pointer is copied into the interior node. At 510, it is determined whether there are more rows in the subsets to compare. In response to a determination that there are more rows in the subsets to compare, process 500 proceeds to 512. In response to a determination that are no more rows in the subsets to compare, process 500 ends. At 512, the winning pointer is advanced by a row. The winning pointer points to a next row in the subset associated with the winning pointer.

At 514, a pointer stride length for the winning pointer is increased according to a pattern. For example, the pattern may be 1, 2, 4, 8, 16, 32, 64, 128, 256. The pointer stride length for the winning pointer may be increased by 1. If the winning pointer wins again, the pointer stride length for the winning pointer may be increased by 2. If the winning pointer wins again, the pointer stride length for the winning pointer may be increased by 4. If the winning pointer wins again, the pointer stride length for the winning pointer may be increased by 8. If the winning pointer wins again, the pointer stride length for the winning pointer may be increased by 16. If the winning pointer wins again, the pointer stride length for the winning pointer may be increased by 32. If the winning pointer wins again, the pointer stride length for the winning pointer may be increased by 64. If the winning pointer wins again, the pointer stride length for the winning pointer may be increased by 128. If the winning pointer wins again, the pointer stride length for the winning pointer may be increased by 256.

By increasing the pointer stride lengths, the number of comparisons performed by the query processing engine is reduced. As a result, the amount of time to respond to the request to sort a dataset is also reduced.

At 516, the row associated with the increased stride length pointed by the winning pointer is compared to the row pointed by the losing pointer. The prefix of the row associated with the increased stride length pointed by the winning pointer is compared to the prefix of the row pointed by the losing pointer. Offset value codes are not utilized to compare the rows because the comparison is not relative to the same third row.

In some embodiments, the row associated with the increased stride length pointed by the winning pointer is the next row in the subset that is pointed by the winning pointer. In some embodiments, the row associated with the increased stride length pointed by the winning pointer is 2 rows after the last row referenced by the winning pointer. In some embodiments, the row associated with the increased stride length pointed by the winning pointer is 4 rows after the last row referenced by the winning pointer. In some embodiments, the row associated with the increased stride length pointed by the winning pointer is 8 rows after the last row referenced by the winning pointer. In some embodiments, the row associated with the increased stride length pointed by the winning pointer is 16 rows after the last row referenced by the winning pointer. In some embodiments, the row associated with the increased stride length pointed by the winning pointer is 32 rows after the last row referenced by the winning pointer. In some embodiments, the row associated with the increased stride length pointed by the winning pointer is 64 rows after the last row referenced by the winning pointer. In some embodiments, the row associated with the increased stride length pointed by the winning pointer is 128 rows after the last row referenced by the winning pointer. In some embodiments, the row associated with the increased stride length pointed by the winning pointer is 256 rows after last row referenced by the winning pointer.

At 518, it is determined whether the winning pointer is still the winning pointer. The winning pointer is still the winning pointer if it references a row having a prefix that causes the row to be included in the merged data subset before the row referenced by the other pointer.

In some embodiments, the winning pointer is still the winning pointer if it references a row having a prefix that causes the row to be included in the merged data subset before the other row (e.g., ASCENDING sort order). In some embodiments, the winning pointer is still the winning pointer if it references a row having a prefix that causes the row to be included in the merged data subset after the other row (e.g., DESCENDING sort order).

In response to a determination that the winning pointer is still the winning pointer, process 500 proceeds to 520. In response to a determination that the winning pointer is no longer the winning pointer, process 500 returns to 508 where the row pointed by the new winning pointer is copied into the interior node. The offset value code of row referenced by the losing pointer is updated relative to the last galloped row that was merged to the interior node.

At 520, one or more rows are copied to the interior node. In some embodiments, the pointer stride associated with the winning pointer is increased by one. The row referenced by the winning pointer is copied into the interior node.

In some embodiments, the pointer stride associated with the winning pointer is increased by a number greater than one. The rows skipped as a result of increasing the pointer stride associated with the winning pointer and the row referenced by the winning pointer are copied into the interior node.

At 522, it is determined whether the pattern is complete. In response to a determination that the pattern is compete, process 500 proceeds to 524. In response to a determination that the pattern is not complete, process 500 returns to 514. At 524, it is determined whether there are one or more remaining rows in the subset associated with the winning pointer to compare.

In response to a determination that there are one or more remaining rows in the subset associated with the winning pointer to compare, process 500 proceeds to 526. In response to a determination that there are no more rows in the subset associated with the winning pointer to compare, process 500 ends.

At 526, the pattern is reset. For example, the pointer stride length is reset from 256 to 1.

FIGS. 6A-6G illustrating an example of merging two data subsets utilizing offset value codes in accordance with some embodiments. In the example shown, rows associated with a first subset 602 are being merged with rows associated with a second subset 612 into an interior node 622.

A row of a data subset may be represented by an offset value code {offset, value}. The offset indicates the index of the sort key at which the two rows differ. The value holds the value of the sort key at the index of the losing row.

The first subset 602 includes rows 601, 603, 605. The second subset 612 includes rows 611, 613, 615. The offset value code associated with a first row of a subset is relative to an empty row. It captures information about the first sort key. When compared to an empty row, rows 601, 611 respectively differ from an empty row at index position "0." The value at index position row for rows 601, 611 is "ABC," "DEF" respectively.

The offset value code of other rows is relative to the preceding row in the subset. For example, the offset value code of row 603 is based on row 601, the offset code of row 605 is based on row 603, the offset value code of row 613 is based on row 611, and the offset value code of row 615 is based on row 613. The offset value code of the second row captures information of the first different key between the rows. Two rows being compared must contain offset value codes relative to the same third row for the comparison to be valid.

The offset at which row 601 and row 603 differ is index position "0" because "ABC" is different than "DEF". The value at the index position is "DEF." Thus, the offset value code for row 603 is {0, DEF}.

The offset at which row 603 and row 605 differ is index position "1" because "65" is different than "90". The value at the index position is "90." Thus, the offset value code for row 605 is {1, 90}.

The offset at which row 611 and row 613 differ is index position "1" because "32" is different than "67". The value at the index position is "67." Thus, the offset value code for row 613 is {1, 67}.

The offset at which row 613 and row 615 differ is index position "0" because "DEF" is different than "ZZZ". The value at the index position is "ZZZ." Thus, the offset value code for row 615 is {0, ZZZ}.

Figure 6A:
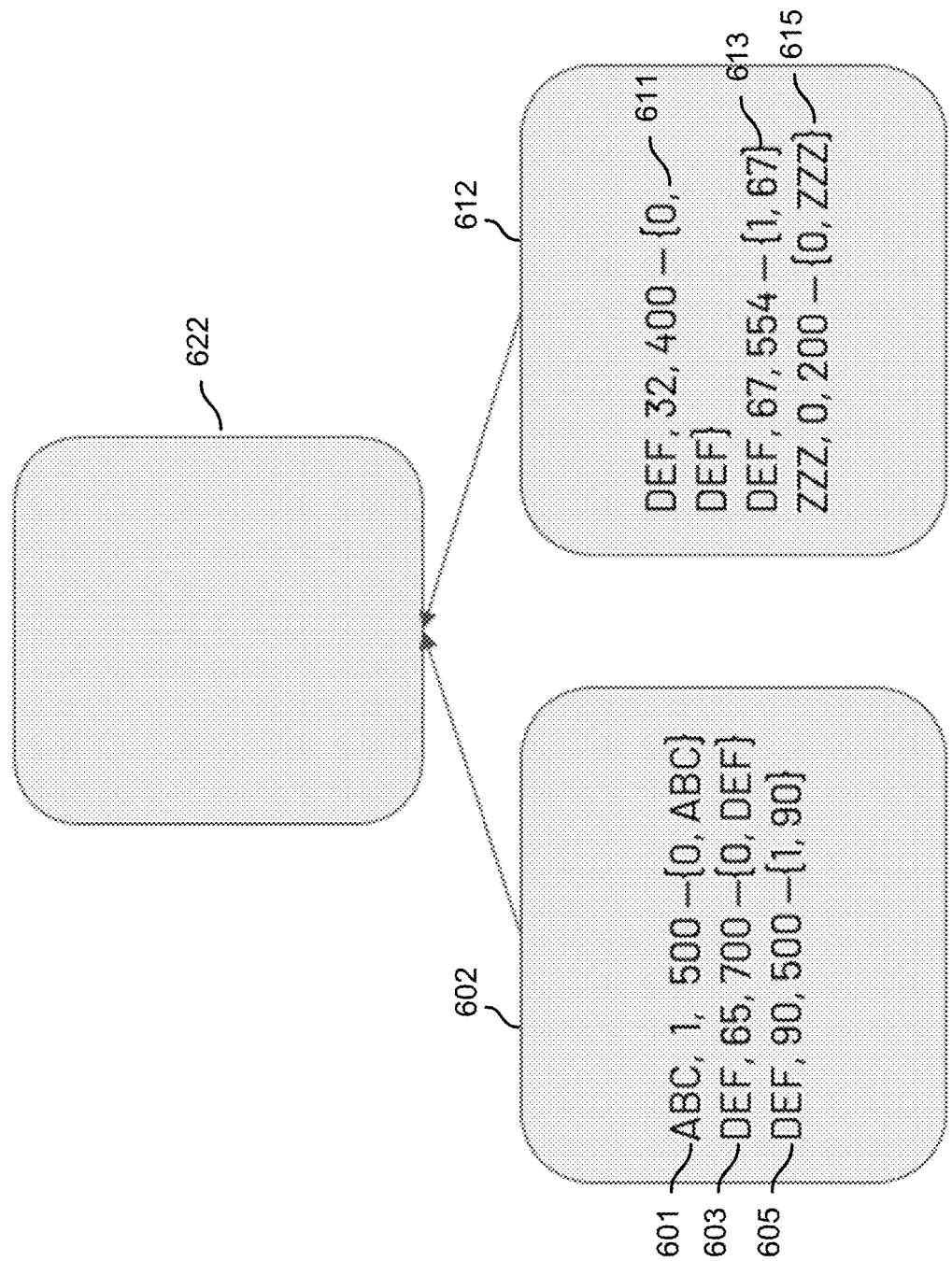
FIGS. 6A-6G illustrating an example of merging two data subsets utilizing offset value codes in accordance with some embodiments.
Figure 6B:
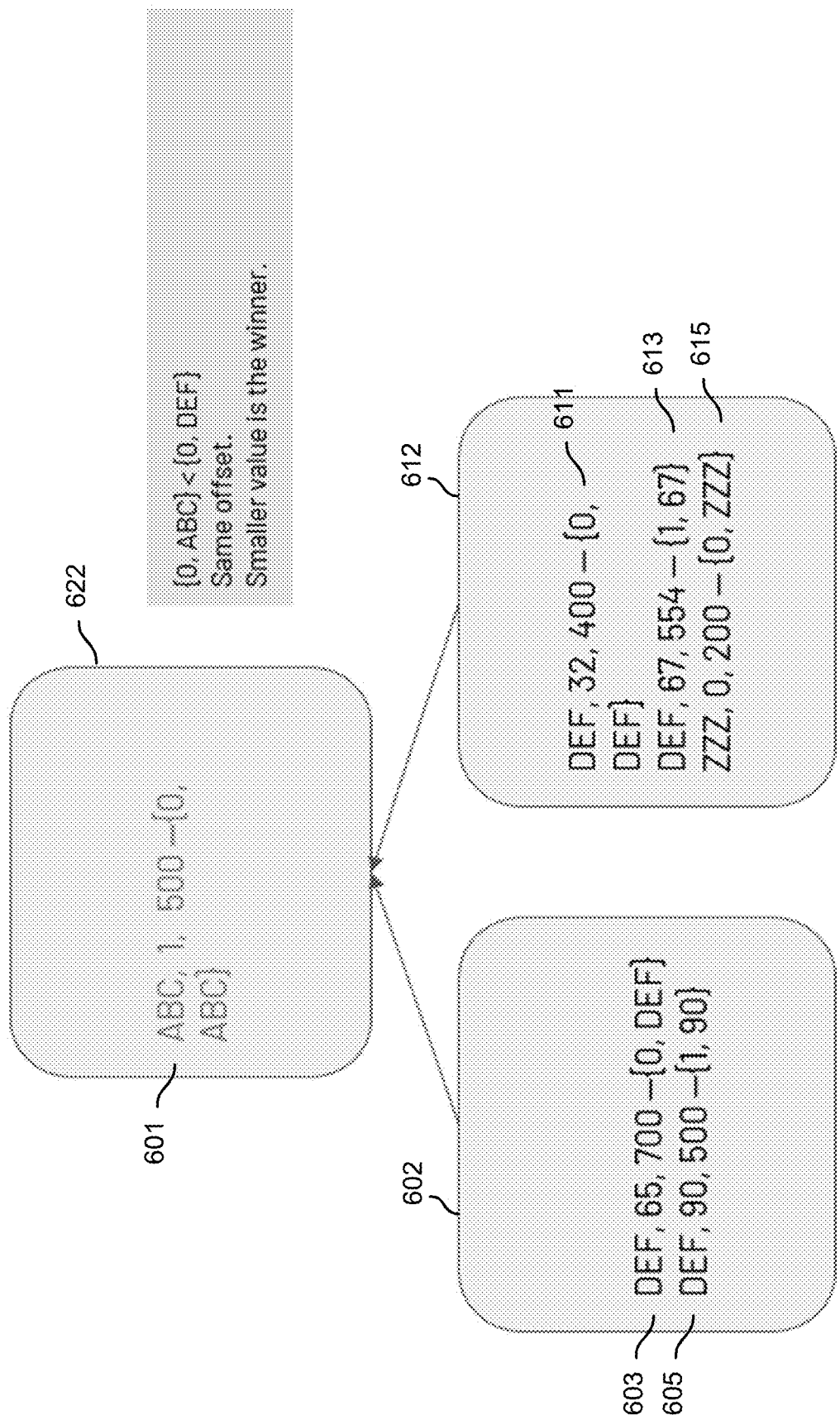
Figure 6C:
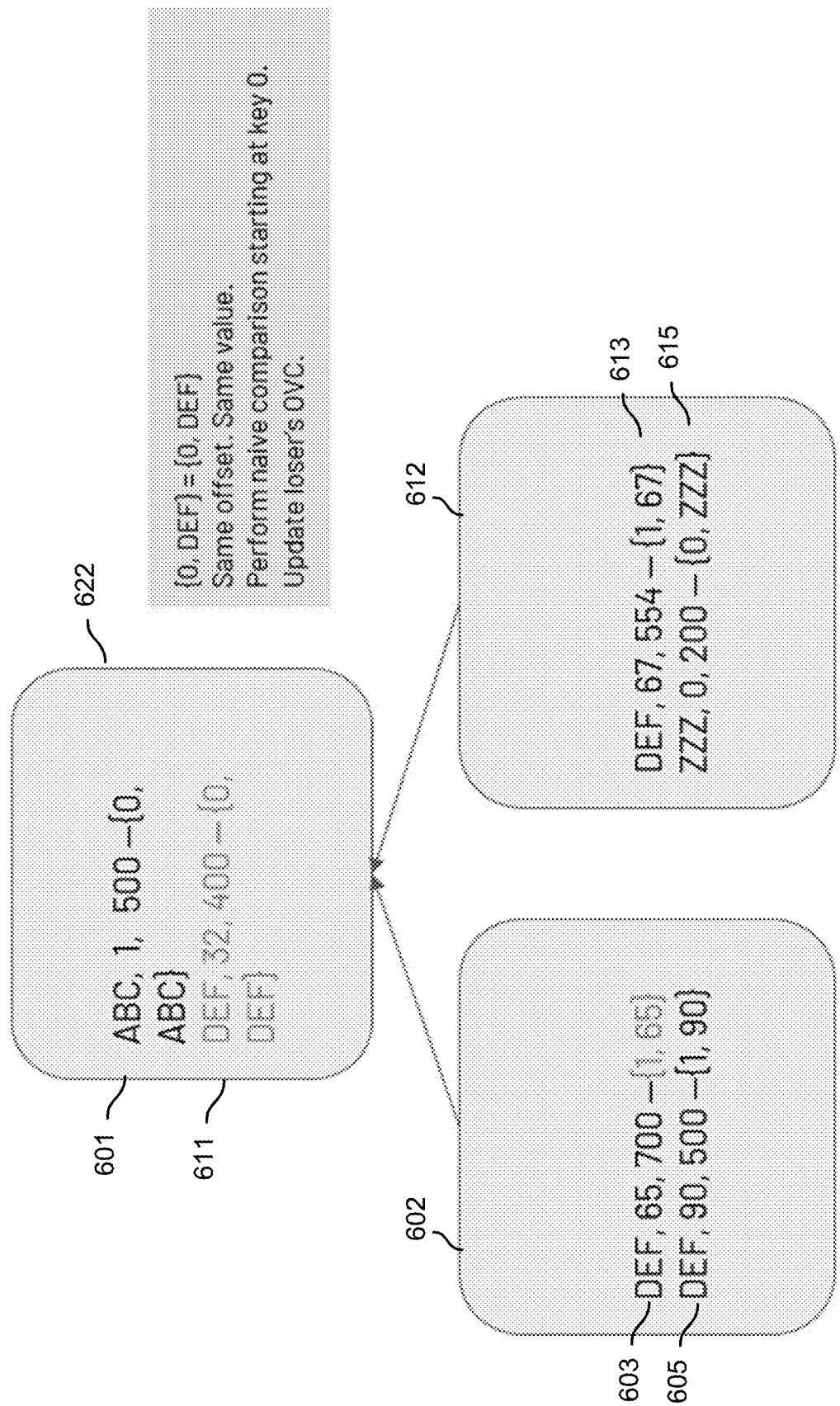

As seen in FIG. 6B, row 601 was compared with row 611. Row 601 is the winner because even though they have the same offset, the value of the offset value code of row 601 is smaller than the value of the offset value code of row 611. Row 601 is copied to interior node 622 and the pointer associated with subset 602 is updated to reference row 603 instead of pointing to row 601.

As seen in FIG. 6C, row 603 was compared with row 611. Row 611 is the winner because even though row 603 and row 611 have the same offset and same value, row 611 has a smaller value at the next index position, i.e., "32" is smaller than "65." Row 611 is copied to interior node 622 and the pointer associated with subset 612 is updated to reference row 613 instead of pointing to row 611. The offset value code for row 603 is updated because there was a tie between itself and row 611. The offset value code is updated to reflect the index position that row 603 and row 611 had a difference and the value at the differing index position.

Figure 6D:
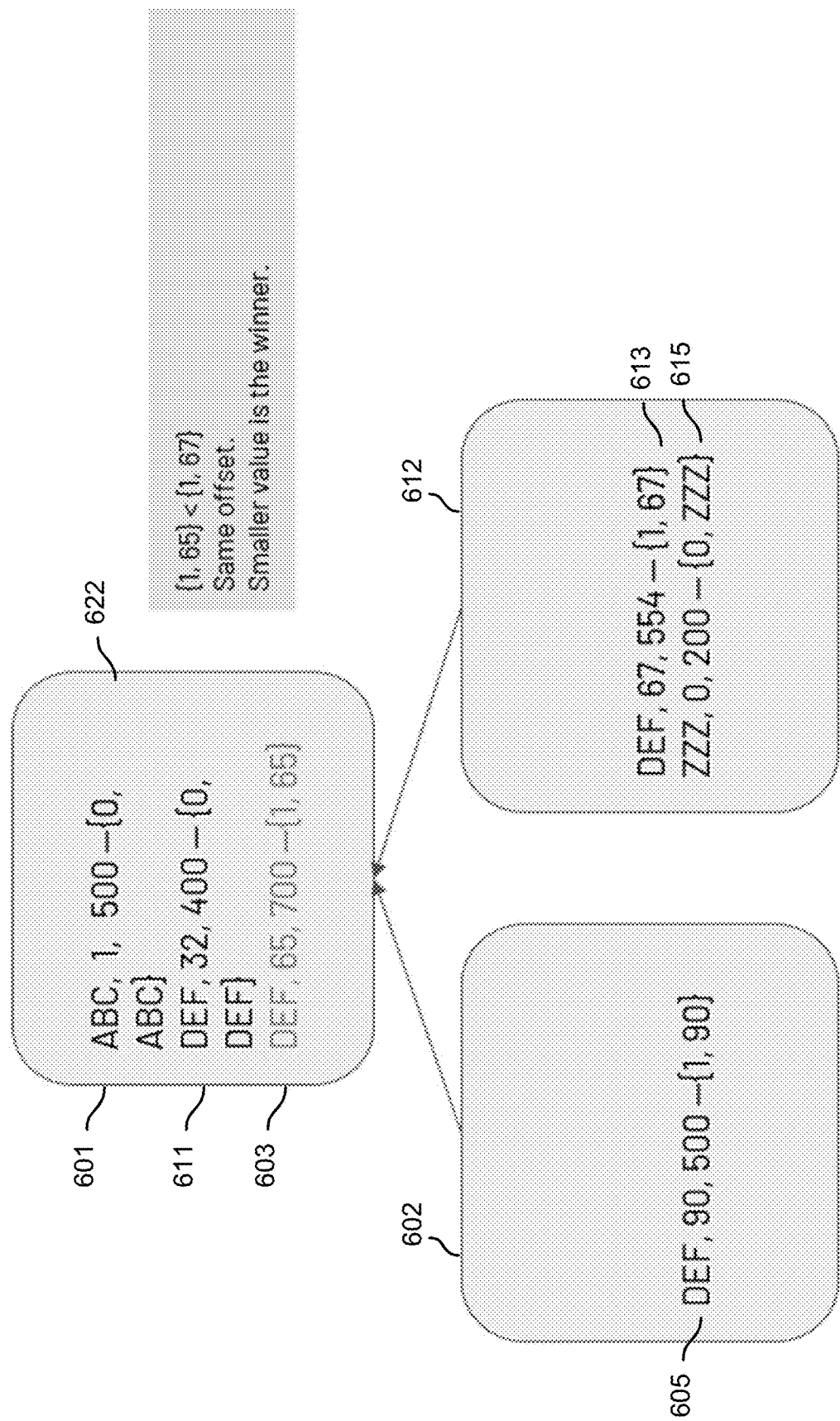

As seen in FIG. 6D, row 603 was compared with row 613. Row 603 is the winner because even though row 603 and row 613 have the same offset, the offset value code of row 603 has a smaller value. Row 603 is copied to interior node 622 and the pointer associated with subset 602 is updated to reference row 605 instead of pointing to row 603.

Figure 6E:
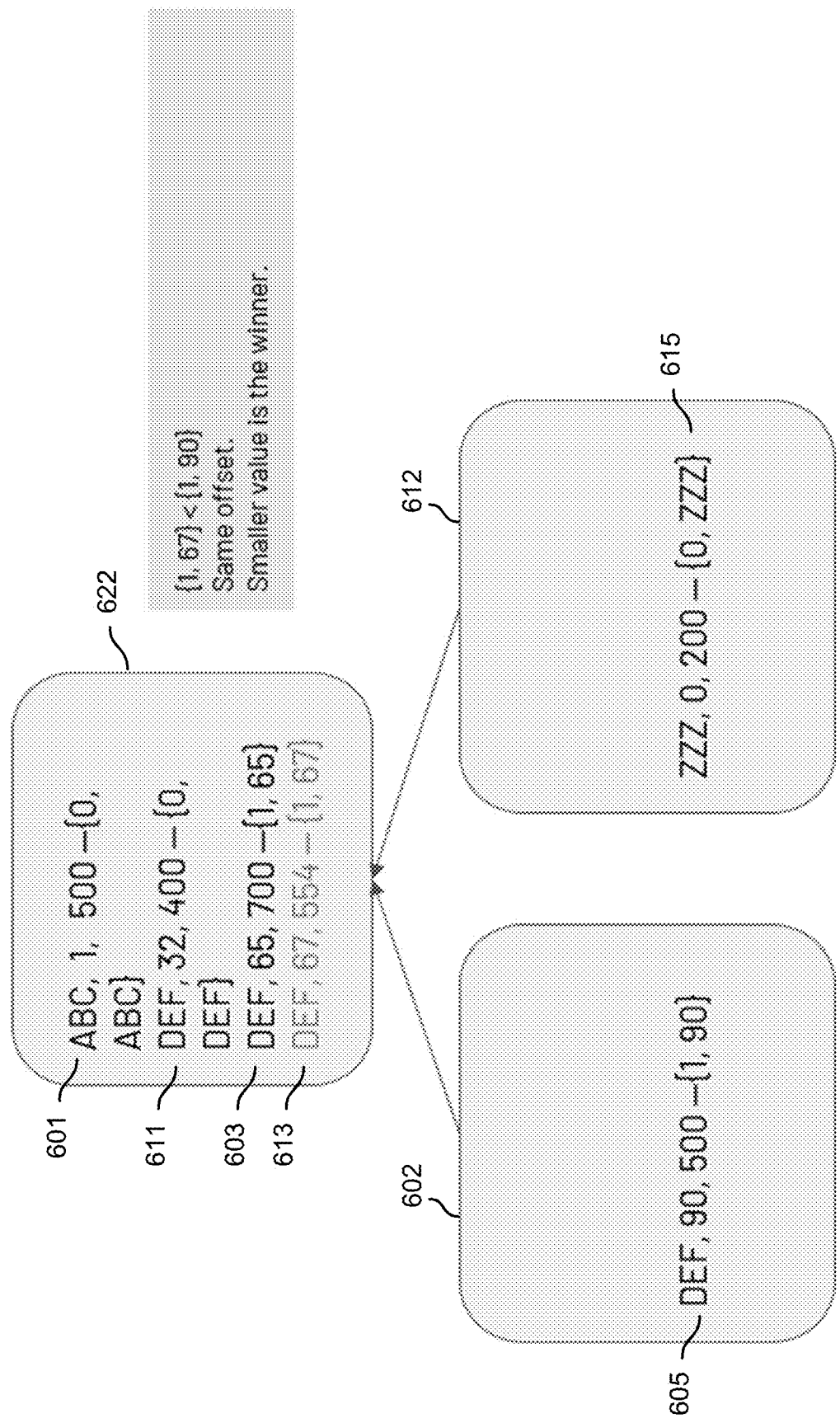

As seen in FIG. 6E, row 605 was compared with row 613. Row 613 is the winner because even though row 603 and row 613 have the same offset, the offset value code of row 613 has a smaller value. Row 613 is copied to interior node 622 and the pointer associated with subset 612 is updated to reference row 615 instead of pointing to row 613.

Figure 6F:
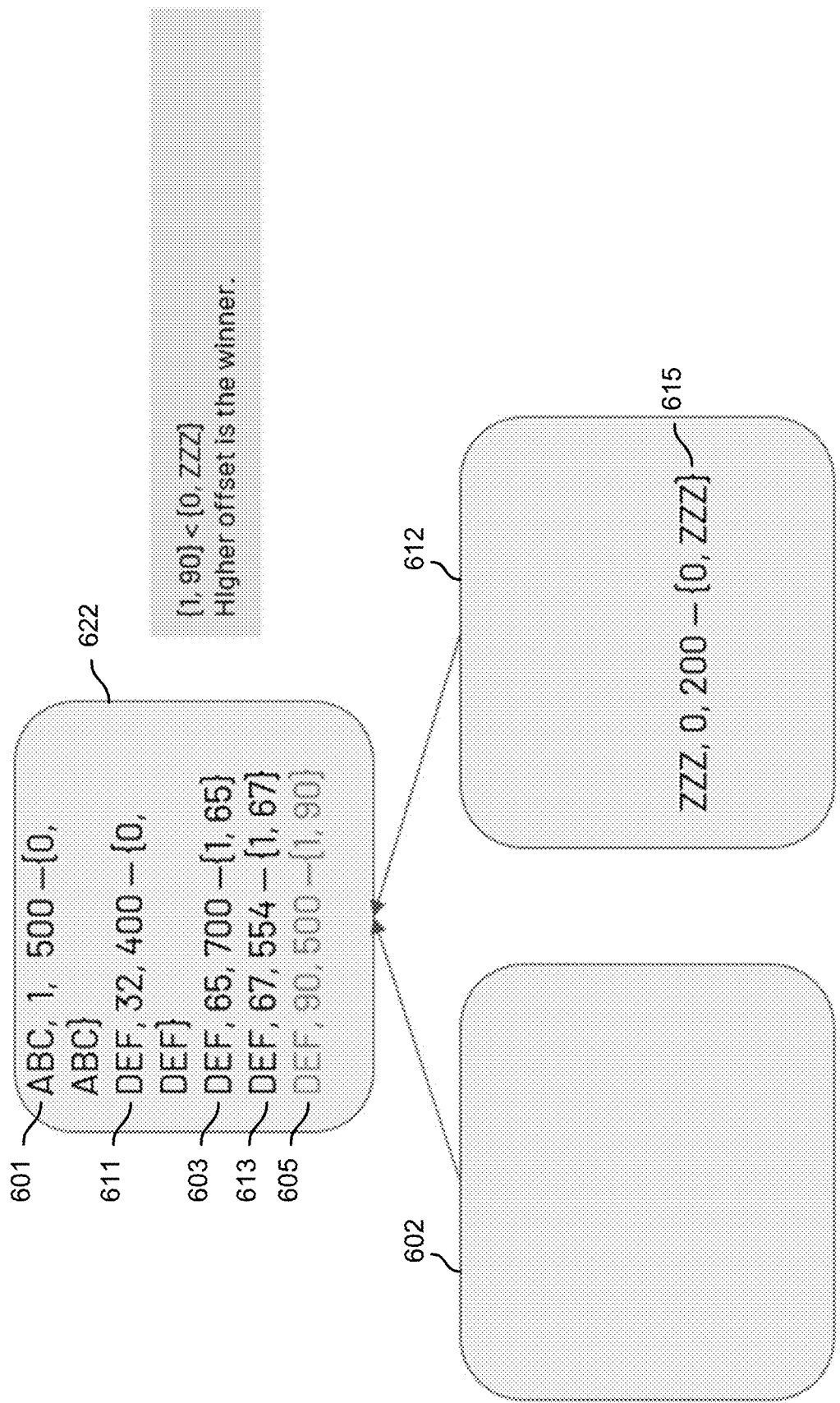
Figure 6G:
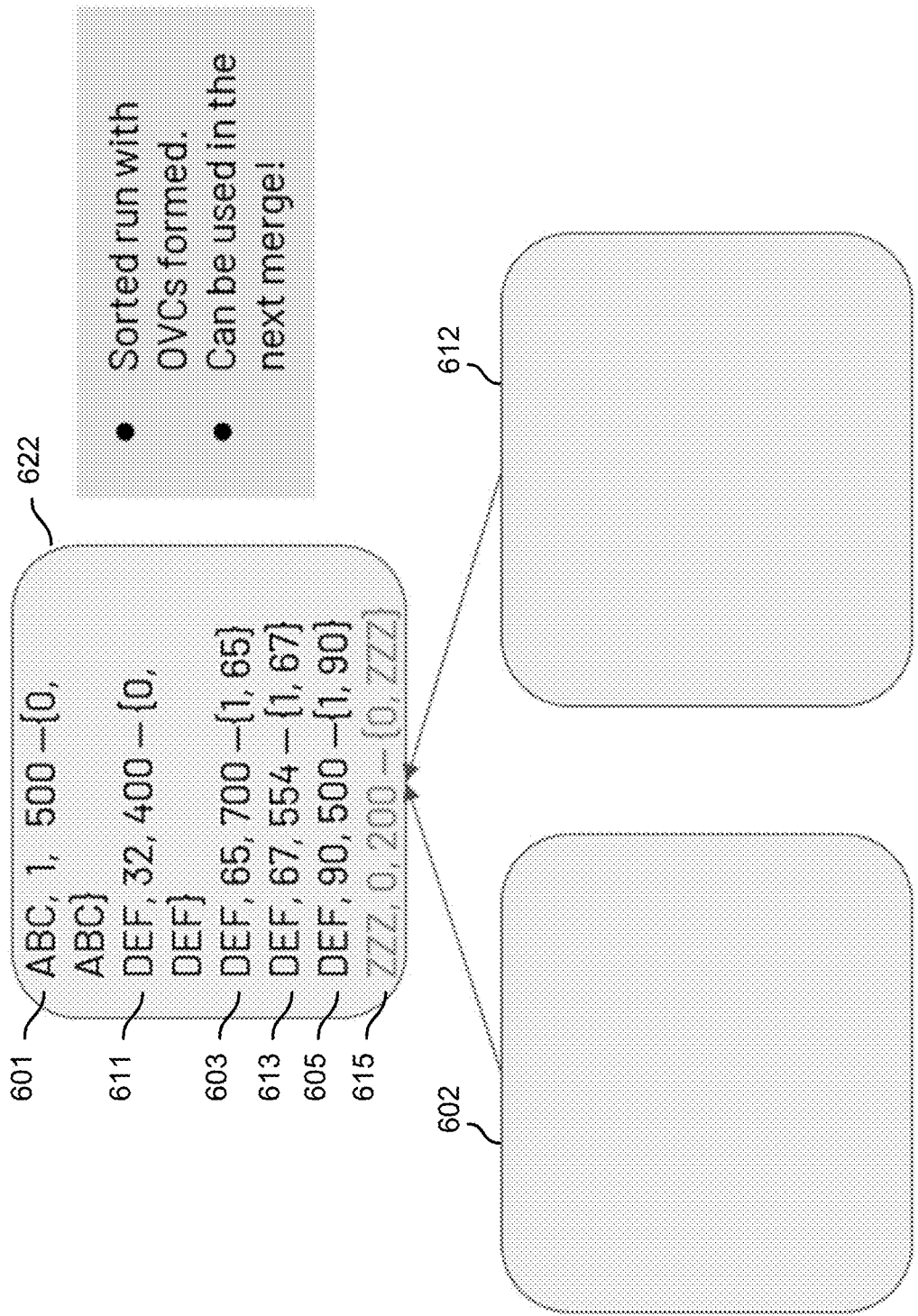

As seen in FIG. 6F, row 605 was compared with row 615. Row 605 is the winner because row 605 has a higher offset value. Row 605 is copied to interior node 622. As seen in FIG. 6G, row 615 is copied to interior node 622.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:
1. A method, comprising:
receiving, by a query processing engine of a database server, from a client device a request to sort a dataset that includes a plurality of rows, the dataset based on one or more input schema elements and an associated sort order for the one or more input schema elements, the dataset stored in a storage of the database server; and sorting the dataset, by the query processing engine of a database server, the sorting comprising, responsive to determining that the dataset is greater than a threshold size, subdividing the dataset into a plurality of data subsets and performing an in-cache sort for each data subset and merging the sorted data subsets, the in-cache sorting comprising, performing a first sort pass of the dataset in part by:

extracting prefixes associated with a first schema element associated with the dataset for the plurality of rows; and sorting the extracted prefixes utilizing an integer sort algorithm based on a sort order included in the request to sort the dataset, wherein sorting the extracted prefixes includes utilizing NULL values to resolve a tied range that includes at least two rows of the plurality of rows having a same extracted prefix.

2. The method of claim 1, wherein the request to sort the dataset includes one or more schema elements and a sort order.

3. The method of claim 1, wherein an input value associated with the first schema element is mapped to a 64-bit integer.

4. The method of claim 3, wherein the input value associated with the first schema element is a primitive data type or a compound data type.

5. The method of claim 3, wherein a first row of the plurality of rows is represented as an array that includes the 64-bit integer and a pointer that references the first row.

6. The method of claim 1, wherein the integer sort algorithm is a radix sort algorithm.

7. The method of claim 1, wherein the first sort pass is performed in-place.

8. The method of claim 1, wherein the first sort pass is performed out-of-place.

9. The method of claim 1, further comprising performing one or more additional passes on the dataset for one or more other schema elements specified in the request to sort the dataset.

10. The method of claim 1, further comprising providing to the client device the sorted dataset.

11. The method of claim 1, wherein performing the first sort pass of the dataset further includes identifying one or more tied ranges.

12. The method of claim 11, wherein performing the first sort pass of the dataset further includes determining whether the dataset is fully sortable.

13. The method of claim 12, wherein in response to determining that the dataset is fully sortable, determining whether the dataset includes one or more null values.

14. The method of claim 13, wherein in response to determining that the dataset includes one or more null values, identifying the tied range that includes at least two rows of the plurality of rows having the same extracted prefix, wherein the same extracted prefix is a prefix equal to a NULL value.

15. The method of claim 14, wherein the identified tied range is sorted based on NULL and non-NULL values.

16. The method of claim 12, wherein in response to determining that the dataset is not fully sortable, performing a comparison sort that compares the rows by NULL/non-NULL.

17. The method of claim 16, comparing the rows by a full key value associated with the rows including a suffix.

18. A system, comprising:
one or more computer processors; and
a non-transitory computer readable medium and comprising computer instructions that cause the one or more computer processors to:
receive, by a query processing engine of a database server, from a client device a request to sort a dataset that includes a plurality of rows, the dataset based on one or more input schema elements and an associated sort order for the one or more input schema elements, the dataset stored in a storage of the database server; and
sort the dataset, by the query processing engine of a database server, the sorting comprising, responsive to determining that the dataset is greater than a threshold size, subdividing the dataset into a plurality of data subsets and performing an in-cache sort for each data subset and merging the sorted data subsets, the in-cache sorting causing the one or more computer processors to:
perform a first sort pass on the dataset in part by causing the one or more computer processors to:
extract prefixes associated with a first schema element associated with the dataset for the plurality of rows; and
sort the extracted prefixes utilizing an integer sort algorithm based on a sort order included in the request to sort the dataset, wherein sorting the extracted prefixes includes utilizing NULL values to resolve a tied range that includes at least two rows of the plurality of rows having a same extracted prefix.

19. The system of claim 18, wherein the instructions further cause the one or more computer processors to provide to the client device the sorted dataset.

20. A computer program product embodied in a non-transitory computer readable medium and comprising computer instructions that when processed by one or more computer processors, cause the one or more computer processors to:
receive, by a query processing engine of a database server, from a client device a request to sort a dataset that includes a plurality of rows, the dataset based on one or more input schema elements and an associated sort order for the one or more input schema elements, the dataset stored in a storage of the database server;
sorting the dataset, by the query processing engine of a database server, the sorting comprising, responsive to determining that the dataset is greater than a threshold size, subdividing the dataset into a plurality of data subsets and performing an in-cache sort for each data subset and merging the sorted data subsets, the in-cache sorting causing the one or more computer processors to perform a first sort pass of the dataset in part by causing the one or more computer processors to:
extract prefixes associated with a first schema element associated with the dataset for the plurality of rows; and
sort the extracted prefixes utilizing an integer sort algorithm based on a sort order included in the request to sort the dataset, wherein sorting the extracted prefixes includes utilizing NULL values to resolve a tied range that includes at least two rows of the plurality of rows having a same extracted prefix.

* * * * *

UNITED STATES PATENT AND TRADEMARK OFFICE
CERTIFICATE OF CORRECTION

Page 1 of 1

PATENT NO. : 12,105,690 B1
APPLICATION NO. : 17/875176
DATED : October 1, 2024
INVENTOR(S) : Armstrong et al.

It is certified that error appears in the above-identified patent and that said Letters Patent is hereby corrected as shown below:

On the Title Page

Item (71), in Column 1, in "Applicant", Line 1, delete "Databricks" and insert -- Databricks, --, therefor.

Item (57) in Column 2, under "ABSTRACT", Line 1, delete "multipass" and insert -- multiple pass --, therefor.

In the Claims

In Column 16, in Claim 17, Line 1, after "claim 16," insert -- wherein --.

Signed and Sealed this
Fourth Day of February, 2025

Coke Morgan Stewart
*Acting Director of the United States Patent and Trademark Office*